United States Patent
Miyake et al.

(10) Patent No.: US 8,226,151 B2
(45) Date of Patent: Jul. 24, 2012

(54) REAR DOOR STRUCTURE

(75) Inventors: Yoshinori Miyake, Haga-gun (JP);
Kenichi Munenaga, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 305 days.

(21) Appl. No.: 12/582,248

(22) Filed: Oct. 20, 2009

(65) Prior Publication Data

US 2010/0102590 A1    Apr. 29, 2010

(30) Foreign Application Priority Data

Oct. 23, 2008 (JP) ................ 2008-273162

(51) Int. Cl.
*B60J 5/10* (2006.01)

(52) U.S. Cl. .............. 296/146.8; 49/502; 52/787.12; 296/56; 296/106; 296/146.2; 296/146.5; 296/146.6

(58) Field of Classification Search ........... 296/146.1, 296/146.5, 146.6, 146.8, 56, 106, 146.2, 296/146.3, 200, 201; 49/502; 52/787.12
See application file for complete search history.

(56) References Cited

U.S. PATENT DOCUMENTS

| | | | | |
|---|---|---|---|---|
| 6,015,182 A * | 1/2000 | Weissert et al. | ............ | 296/146.6 |
| 6,053,562 A * | 4/2000 | Bednarski | .................. | 296/146.5 |
| 6,241,307 B1 * | 6/2001 | Kim | .......................... | 296/146.8 |
| 6,776,449 B2 * | 8/2004 | Komatsu et al. | ........... | 296/146.5 |
| 6,929,308 B2 * | 8/2005 | Komatsu et al. | ........... | 296/146.5 |
| 7,306,279 B2 * | 12/2007 | Saitoh | ........................ | 296/146.8 |
| 7,537,267 B2 * | 5/2009 | Tanaka et al. | .............. | 296/146.6 |
| 7,591,501 B2 * | 9/2009 | Tanaka et al. | .............. | 296/146.6 |
| 7,614,681 B2 * | 11/2009 | Saitoh et al. | ............... | 296/146.5 |
| 7,618,083 B2 * | 11/2009 | Munenaga et al. | ........ | 296/146.6 |
| 7,914,066 B2 * | 3/2011 | Miyake et al. | .............. | 296/146.6 |
| 2003/0122399 A1 * | 7/2003 | Seksaria et al. | ............ | 296/146.8 |
| 2005/0110297 A1 * | 5/2005 | Seksaria et al. | ............ | 296/146.1 |
| 2007/0145773 A1 | 6/2007 | Saitoh | | |

FOREIGN PATENT DOCUMENTS

| | | | |
|---|---|---|---|
| EP | 1803597 | | 7/2007 |
| JP | 56112316 | | 9/1981 |
| JP | 04055125 A | * | 2/1992 |
| JP | 04191124 | | 7/1992 |
| JP | H4-123813 | | 11/1992 |
| JP | 7-246838 | | 9/1995 |
| JP | 2004330963 | | 11/2004 |
| JP | 2007-176358 | | 7/2007 |

* cited by examiner

*Primary Examiner* — Glenn Dayoan
*Assistant Examiner* — Paul Chenevert
(74) *Attorney, Agent, or Firm* — Rankin, Hill & Clark LLP

(57) ABSTRACT

A rear door structure in which a rear door is openably and closably provided on a rear portion of a vehicle body, including a door panel, wherein: the door panel includes an upper door panel and a lower door panel provided on the lower portion of the upper door panel; and a lower edge portion of the upper door panel and an upper edge portion of the lower door panel mutually overlap so as to form a lateral beam having a closed cross section and extending in a vehicle width direction.

19 Claims, 5 Drawing Sheets

REAR DOOR STRUCTURE

Priority is claimed on Japanese Patent Application No. 2008-273162, filed Oct. 23, 2008, the contents of which are incorporated herein by reference.

BACKGROUND OF THE INVENTION

1. Field of the Invention

The present invention relates to a structure of a rear door openably and closably provided at a rear opening portion of a vehicle.

2. Description of the Related Art

In hatchback type vehicles or the like, an opening portion is provided at a rear portion of a vehicle body, at which a rear door is openably and closably provided. The rear door is generally provided with a frame portion to which a rear glass is attached.

There is known a vehicle rear body structure having the above-described structure at a rear portion of a vehicle body, in which a lateral beam having a closed sectional structure is provided so as to extend along a lower edge of a rear glass (see, for example, Japanese Unexamined Patent Application, First Publication No. 2007-176358).

In this vehicle rear body structure, a frame portion is provided at a door panel which is attached to a door frame. In addition, the lateral beam is separately attached to the frame portion in which both ends of the lateral beam are connected to the respective lateral side portions of the frame portion so as to horizontally partition the frame portion into an upper region and a lower region. The rear glass is provided in the upper region of the partitioned frame portion and an extra glass is provided in the lower region thereof.

However, in the conventional rear door structure described above, the lateral beam for reinforcing the structure is separately provided. Thus, there is a concern that as the number of parts increases, the cost increases.

In particular, forming a door panel by joining an upper door panel constituting the upper half of the door panel and a lower door panel constituting the lower half of the door panel has been considered. In this case, the number of parts further increases. For this reason, it is becoming more important to decrease the number of parts.

In view of the above-described circumstances, the present invention has an object of providing a rear door structure which is simplified and has a fewer number of parts and enables enhancement of the rigidity thereof.

SUMMARY OF THE INVENTION

In order to achieve the above-described object, the present invention employs the following. Namely, a rear door structure according to an aspect of the present invention in which a rear door is openably and closably provided on a rear portion of a vehicle body, the rear door structure including a door panel, wherein: the door panel includes an upper door panel and a lower door panel provided on the lower portion of the upper door panel; and a lower edge portion of the upper door panel and an upper edge portion of the lower door panel mutually overlap so as to form a lateral beam having a closed cross section and extending in a vehicle width direction.

According to the above-described aspect of the present invention, the door panel is reinforced in the vehicle width direction with the lateral beam formed by overlapping the upper door panel and the lower door panel.

Specifically, since the door panel is reinforced in the vehicle width direction with the lateral beam having a closed sectional structure formed by overlapping the upper door panel and the lower door panel, it is possible to enhance the rigidity of the rear door structure which is simplified without increasing the number of parts.

It may be arranged that: the upper door panel is provided with a frame portion to which a rear glass is to be attached; both ends of the upper edge portion of the lower door panel are provided with a extending portion which extends upward; and the extending portions overlap and are joined to both lateral side portions of the frame portion.

In this case, because of the presence of the extending portions formed on the lower door panel, the lower corner portions of the frame portion are reinforced and the upper door panel and the lower door panel are solidly joined to each other. Specifically, the extending portion, which is provided at each lateral end of the upper edge portion of the lower door panel so as to extend upward, overlaps and is joined to both lateral side portions of the frame portion. As a result, because of the presence of the extending portions formed on the lower door panel, the lower corner portions of the frame portion are reinforced to enhance the rigidity of the frame portion in clamping the rear glass, and the upper door panel and the lower door panel are solidly joined to each other.

It may be arranged that the above-described rear door structure further includes a reinforcing member which extends over the lateral beam and both lateral edges of the upper door panel and the lower door panel. In this case, since there is provided the reinforcing member which extends over the lateral beam and both Lateral edges of the upper door panel and the lower door panel, the rigidity of both ends of the lateral beam can be reliably enhanced.

It may be arranged such that the door panel is joined to a door frame via the reinforcing member.

In this case, a load applied to the lateral beam can also be borne by the door frame via the reinforcing member.

Therefore, since the reinforcing members are joined to the door frame, a load applied to the lateral beam can also be borne by the door frame, and thereby the support stiffness of both ends of the lateral beam can be further enhanced.

It may be arranged such that in a beam forming region forming the lateral beam, one of the lower door panel and the upper door panel is provided with a welding work hole which leads to a coupling portion of the reinforcing member and the other of the lower door panel and the upper door panel.

In this case, when welding the lateral beam of a closed sectional structure to the reinforcing member, the welding gun can be inserted into the welding work hole formed on one panel in the beam forming region, and thus the tip of the welding gun can be pressed onto the coupling portion of the reinforcing member and the other panel.

Specifically, the welding gun can be inserted into the welding work hole formed on one of the lower door panel and the upper door panel in the beam forming region, and thus the tip of the welding gun can be pressed onto the coupling portion of the reinforcing member and the other of the lower door panel and the upper door panel. As a result, welding work between the other of the lower door panel and the upper door panel and the reinforcing member can be performed reliably and easily in the closed cross section of the lateral beam.

It may be arranged such that the lower door panel and the upper door panel are mutually spot welded at the center and both ends, in the vehicle width direction, of the beam forming region forming the lateral beam.

In this case, since the lower door panel and the upper door panel are mutually spot welded at the center and both ends, with respect to the vehicle width direction, of the beam forming region forming the lateral beam, the rigidity of the lateral beam can be enhanced over the entire length thereof with good balance.

DETAILED DESCRIPTION OF THE INVENTION

An embodiment of the present invention will be explained below with reference to the drawings. In the following explanation, unless otherwise specified, "top", "bottom", "left", and "right" refer to the top, bottom, left, and right with respect to the vehicle body.

Figure 1:
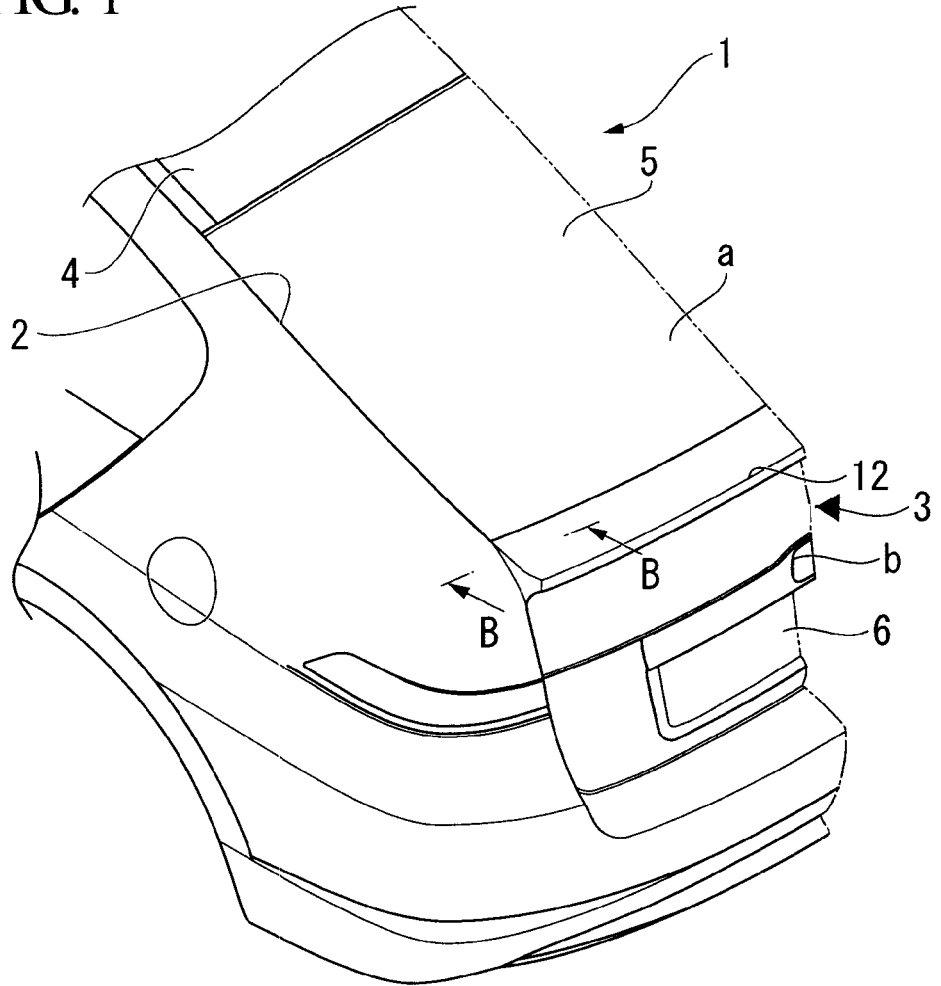
FIG. 1 is a perspective view showing a vehicle according to an embodiment of the present invention seen from the backward.

FIG. 1 shows a vehicle 1 employing a rear door structure according to the embodiment of the present invention.

As shown in the figure, the vehicle 1 is a hatchback type vehicle in which a surface of the rear portion of the vehicle body thereof is provided with an opening portion 2 on which a rear door 3 is openably and closably provided. The upper end of the rear door 3 is supported at the upper edge of the opening portion 2 so that the rear door 3 can be flipped up. The rear door 3 includes an inclined surface a and a vertical surface b, the inclined surface a, when the rear door 3 closes, inclining backward and downward from a roof 4 of the vehicle body and the vertical surface b, when the rear door 3 closes, extending downward from the rear end of the inclined surface a. A rear glass 5 is placed on the inclined surface a while an extra window glass 6 is placed on the vertical surface b.

Figure 2:
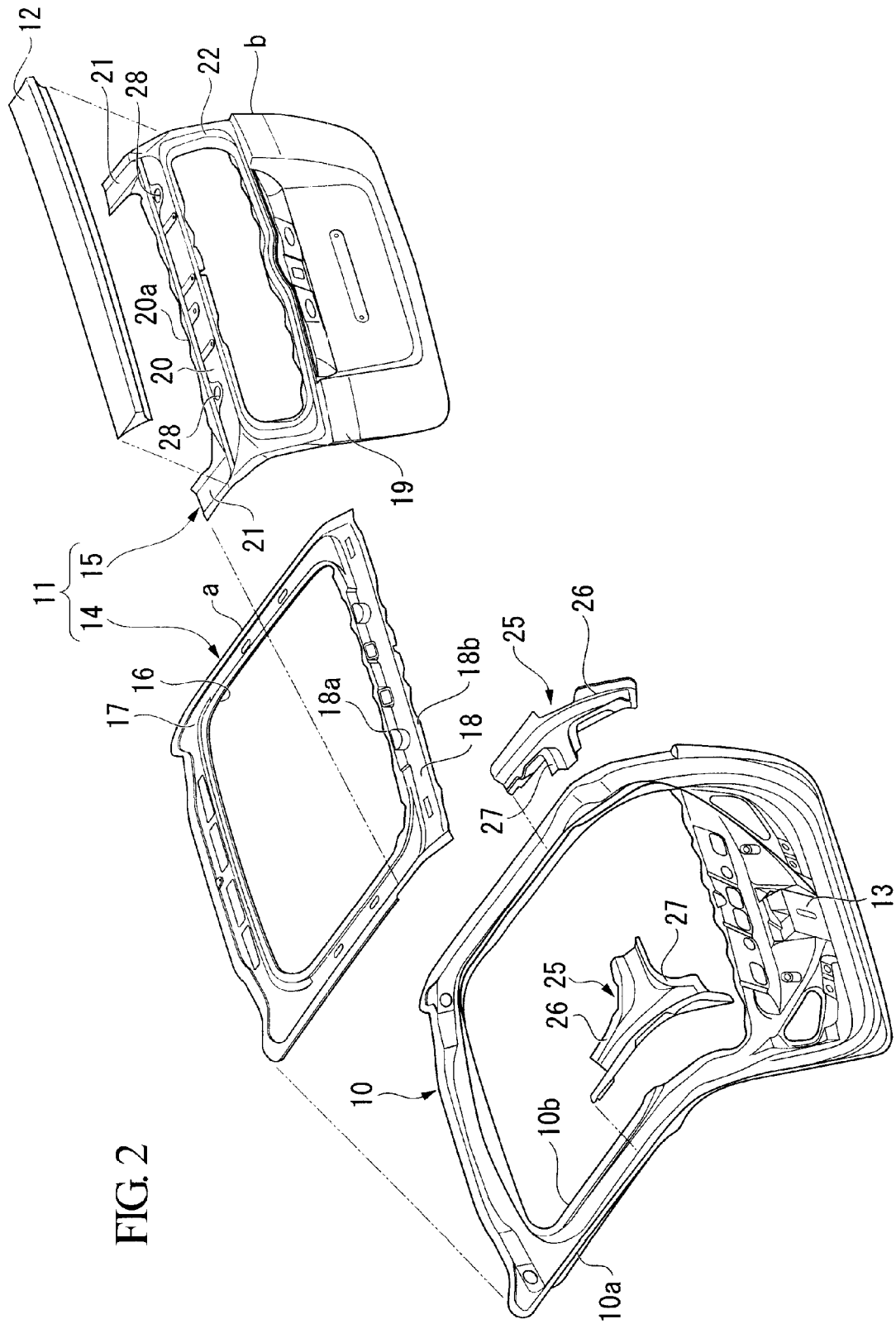
FIG. 2 is an exploded perspective view showing a rear door according to the embodiment.

FIG. 2 is an exploded perspective view showing the rear door 3.

As shown in the figure, the rear door 3 includes: a door frame 10 being one of frame members; a door panel component 11 (door panel) attached to a vehicle exterior side of the door frame 10; and a rear spoiler 12 attached to the vehicle exterior side surface of the door component panel 11. The door frame 10 and the door panel component 11 are made from steel plate material while the rear spoiler 12 is made of resin material.

The door frame 10 is bent in a V shape in a side view so as to form the above-mentioned inclined surface a and the vertical surface b, and formed in substantially a rectangular shape in a front view. The peripheral portion of the door frame 10 is formed in substantially a hat shape opening toward the vehicle exterior side. Further, the outer peripheral edge and the inner peripheral edge are provided with a flange portion 10a and 10b, respectively. It should be noted that the reference numeral 13 in the figure denotes an attachment portion provided on the center of the lower edge portion of the door frame 10 for attaching a lock mechanism thereto. In addition, the inner area of the door frame 10 of substantially a rectangular shape opens over the inclined surface a, the vertical surface b, and a bent portion between the inclined surface a and the vertical surface b.

The door panel component 11 includes: an upper door panel 14 constituting the upper half portion of the door panel component 11 and substantially corresponding to the above-mentioned inclined surface a; and a lower door panel 15 constituting the lower half portion of the door panel component 11 and substantially corresponding to the above-mentioned vertical surface b. The upper door panel 14 and the lower door panel 15 are mutually welded and fixed.

Figure 3:
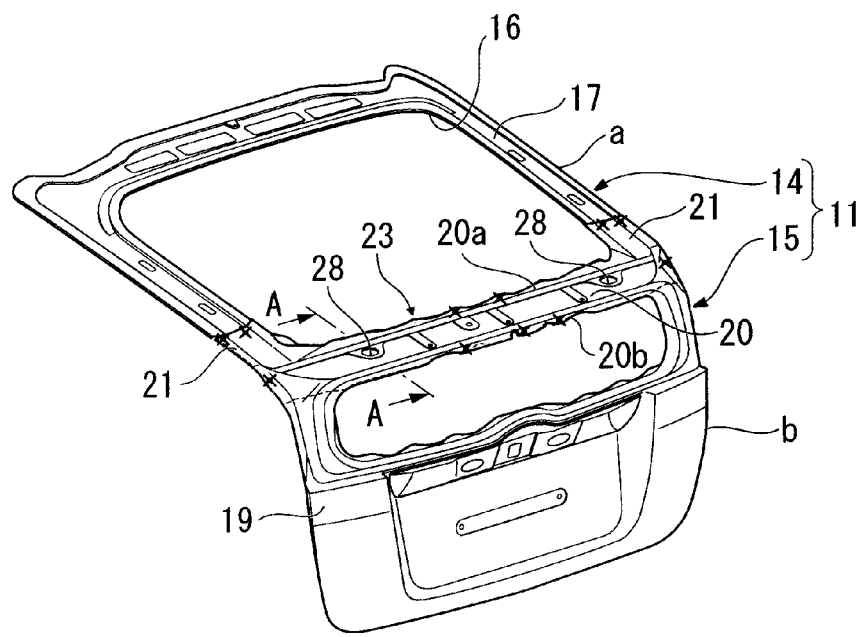
FIG. 3 is a perspective view showing a door panel component of the rear door according to the embodiment.
Figure 4:
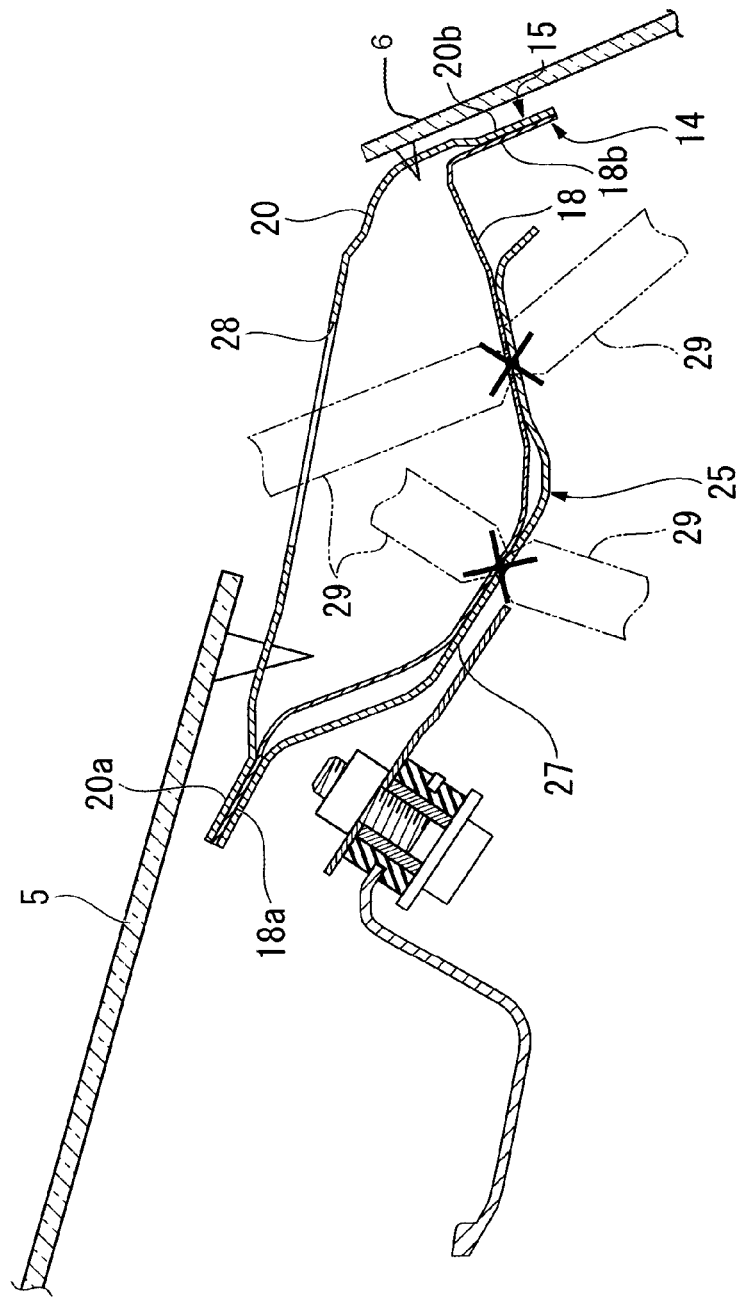
FIG. 4 is a cross sectional view of FIG. 3 taken along the line A-A.
Figure 5:
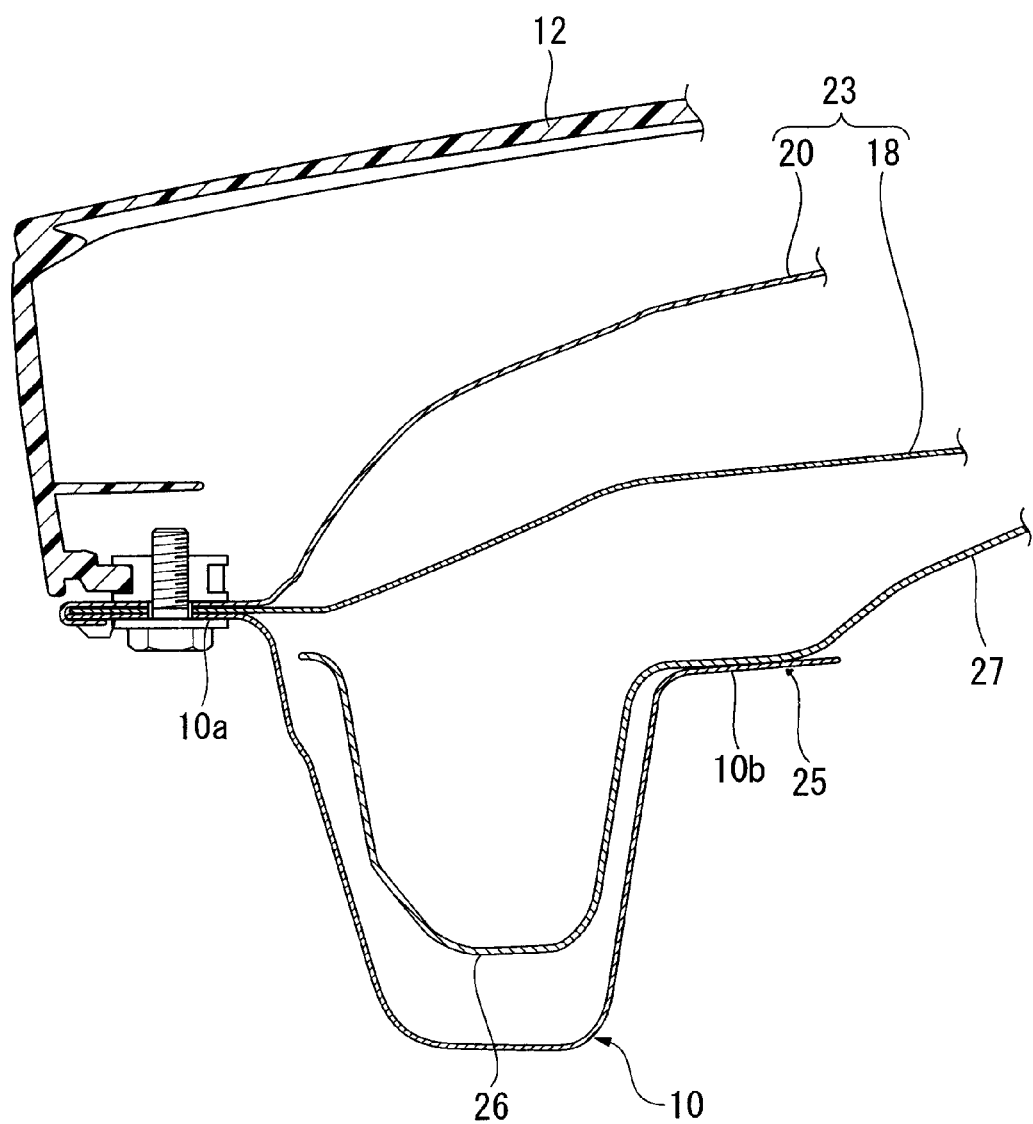
FIG. 5 is a cross sectional view of FIG. 1 taken along the line B-B.

FIG. 3 shows a door panel component 11 in which the upper door panel 14 and the lower door panel 15 are mutually welded and fixed. Meanwhile, FIG. 4 and FIG. 5 show a cross section of the rear door 3.

As shown in FIG. 2 and FIG. 3, a window opening portion 16 is formed on the inner side of the upper door panel 14. In addition, the upper hem and both lateral hems of the window opening portion 16 constitutes a frame portion 17 for supporting the upper edge and the lateral edges of the rear glass 5, respectively. Further, as shown in FIG. 2 and FIG. 4, the lower edge of the upper door panel 14 is provided with a lower beam constituent 18 which extends along the vehicle width direction and has a hat-shape cross section with the middle area thereof protruding downward.

On the other hand, the lower door panel 15 is provided with a substantially rectangular-shape panel body 19 constituting the vertical surface b, and the upper edge portion of the panel body 19 is provided with an upper beam constituent 20 which is bent toward the roof 4 of the vehicle body. The upper beam constituent 20 extends along the vehicle width direction and has a hat-shape cross section with the middle area thereof protruding upward. In addition, both edge portions, with respect to the vehicle width direction, of the upper beam constituent 20 are provided with an extending piece 21 (extending portion) which extends obliquely upward along the inclined surface a. Further, a frame portion 22 is provided immediately beneath the upper beam constituent 20 provided on the upper portion of the panel body 19. The extra window glass 6 is to be attached to the frame portion 22.

The upper beam constituent 20 and both extending pieces 21 overlap with and are welded to be fixed to the lower edge of the upper door panel 14. Specifically, as shown in FIG. 4, flange portions 20a and 20b of the upper beam constituent 20 are welded to be fixed to a front flange portion 18a and a back flange portion 18b of the lower beam constituent 18, respectively. Thereby, the upper beam constituent 20 together with the lower beam constituent 18 forms a lateral beam 23 which has a closed sectional structure and extends in the vehicle width direction. In addition, each edge portion of the upper beam constituent 20 in the vehicle width direction is curved downward to lateral edge portions thereof as shown in FIG. 5. The lateral edge portions of the upper beam constituent 20 overlap to the upper surface of the lower beam constituent 18. Each extending piece 21 overlaps and is welded to be fixed to the upper surface at the lower end of a lateral side portion of the frame portion 17. As illustrated by "X" in FIG. 3, the lower door panel 15 and the upper door panel 14 are mutually spot welded at a plurality of points, that is, the center and both ends, in the vehicle width direction, of the beam forming regions of the lower door panel 15 and the upper door panel 14, the beam forming regions forming the lateral beam 23. It should be noted that the spot welded points between the upper beam constituent 20 and the lower beam constituent 18 are arranged in houndstooth if at all possible.

In addition, the rear spoiler 12 made of resin is attached to the upper surface of the lateral beam 23 formed of the lower beam constituent 18 and the upper beam constituent 20.

Further, substantially T-shaped center stiffeners 25, which are reinforcing members, are welded to be fixed to the upper surface of the bent region at both lateral side portions of the door frame 10. The lateral beam 23 of the door panel component 11 is spot welded to be fixed to the door frame 10 via the center stiffeners 25. Each of the center stiffeners 25 includes: a base portion 26 overlapping and fixed to the upper surface of the bent region of the door frame 10; and a support piece 27 extending from substantially the center of the base portion 26 to the vehicle interior in the vehicle width direction. Both lateral edge portions of the lateral beam 23 (lower beam constituent 18) are attached to the upper surface of the support pieces 27. Each of the support pieces 27 is formed to have a cross section substantially hat-shaped with the center in the backwards and forwards direction protruding downward.

The upper beam constituent 20 of the lower door panel 15 is provided with welding work holes 28 that each face the tips of the support pieces 27 of the center stiffeners 25. When the lateral beam 23 and the center stiffener 25 are welded, the tip of a weld gun 29 is inserted into the welding work hole 28 as shown in FIG. 4. It should be noted that the welding work hole 28 is sealed with a grommet (not shown in the figures) after the welding work.

In addition, the outer peripheral edges of the upper door panel 14 and the lower door panel 15 are joined with the door frame 10 by hemming (refer to FIG. 5).

As is explained above, in the rear door 3 of the vehicle 1 according to the present embodiment, the lower beam constituent 18 of the upper door panel 14 and the upper beam constituent 20 of the lower door panel 15 mutually overlap and are welded to be fixed. Based on the configuration above, since the lateral beam 23 having closed sectional structure and extending along the vehicle width direction, the rear door structure is simplified and does not require an additional part. As a result, it is possible to reliably enhance the rigidity and strength of the door panel component 11 in the vehicle width direction.

In particular, in the rear door 3, both ends of the upper edge portions of the lower door panel 15 are provided with the extending pieces 21 which protrude upward. Both of the extending pieces 21 together with the upper beam constituent 20 overlap with and are welded to be fixed to the upper door panel 14. Accordingly, it is possible to enhance the joint strength between the lower door panel 15 and the upper door panel 14, the rigidity and strength of the lower corner portions of the frame portion 17, and the clamping rigidity in the clamping of the rear glass 5.

In addition, the rear door 3 is provided with substantially T-shaped center stiffeners 25 which straddle the lateral beam 23 and the lateral edge portions of both the upper door panel 14 and the lower door panel 15. With this configuration, the rigidity of both ends of the lateral beam 23 can be reliably enhanced, thereby further enhancing the rigidity of the rear door 3 as a whole.

Moreover, since the center stiffeners 25, which are reinforcing members, are welded to be fixed to the door frame 10 in the rear door 3, a load applied to the lateral beam 23 can be efficiently borne by the door frame 10, and thereby the support stiffness of both ends of the lateral beam 23 can be further enhanced.

Further, in the rear door 3 according to the present embodiment, the welding work holes 28 are formed on the upper beam constituent 20. Accordingly, when the lateral beam 23 and the center stiffener 25 are welded to be fixed to each other, the tip of the weld gun 29 can be pressed onto a point to be welded through the welding work hole 28. As a result, welding work between the lower beam constituent 18 and the center stiffener 25 can be performed reliably and easily in the closed cross section of the lateral beam 23.

Further, the lower beam constituent 18 and the upper beam constituent 20 are mutually spot welded at the center and both ends, with respect to the vehicle width direction, of the beam forming region. Therefore, the present embodiment is also advantageous in that the rigidity of the lateral beam 23 can be enhanced over the entire length thereof with good balance.

It should be noted that the present invention is not limited to the embodiment described above. Various design modifications may be made without departing from the spirit or scope of the present invention.

For example, the upper door panel 14 and the lower door panel 15 are mutually overlapped and welded to be fixed so that the edge of the lower door panel 15 is placed on the edge of the upper door panel 14, thereby forming the lateral beam 23 which has a closed sectional structure and extends along the vehicle width direction. However, the upper door panel 14 and the lower door panel 15 may be mutually overlapped and welded to be fixed so that the edge of the upper door panel 14 is placed on the edge of the lower door panel 15 for forming the lateral beam 23 of a closed sectional structure.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A rear door structure in which a rear door is openably and closably provided on a rear portion of a vehicle body, wherein:
    the rear door comprises: a door frame; a door panel attached to a vehicle exterior side of the door frame; an inclined surface, when the rear door closes, inclining backward and downward from a roof of the vehicle body; and a vertical surface, when the rear door closes, extending downward from the rear end of the inclined surface;
    the door panel comprises an upper door panel constituting the inclined surface and a lower door panel provided on the lower portion of the upper door panel and constituting the vertical surface;
    a rear glass is attached to the upper door panel and an extra window glass is attached to the lower door panel;
    a lower edge portion of the upper door panel and an upper edge portion of the lower door panel mutually overlap so as to form a lateral beam having a closed cross section and extending in a vehicle width direction; and,
    the lower end of the rear glass and the upper end of the extra window glass are attached to the lateral beam.

2. The rear door structure according to claim 1, wherein the door frame is bent in a V shape in a side view so as to form the inclined surface and the vertical surface, and opens toward the vehicle exterior side over the inclined surface, the vertical surface, and a bent portion between the inclined surface and the vertical surface.

3. The rear door structure according to claim 1, further comprising a rear spoiler attached to the upper surface of the lateral beam.

4. The rear door structure according to claim 1, wherein:
    the lower edge portion of the upper door panel is provided with a lower beam constituent which extends along the vehicle width direction;

the upper edge portion of the lower door panel is provided with an upper beam constituent which is bent toward the roof of the vehicle body and extends along the vehicle width direction; and the upper beam constituent is welded to the lower beam constituent to form the lateral beam.

5. The rear door structure according to claim 4, wherein:

the door frame has a peripheral portion formed in substantially a hat shape opening toward the vehicle exterior side; and each edge portion of the upper beam constituent in the vehicle width direction is curved downward to lateral edge portions thereof; and the lateral edge portions overlap and are joined with an upper surface of the lower beam constituent and the outer peripheral edges of the peripheral portion.

6. The rear door structure according to claim 1, further comprising a reinforcing member which extends over the lateral beam and both lateral edges of the upper door panel and the lower door panel.

7. The rear door structure according to claim 6, wherein in a beam forming region forming the lateral beam, one of the lower door panel and the upper door panel is provided with a welding work hole which leads to a coupling portion of the reinforcing member and the other of the lower door panel and the upper door panel.

8. The rear door structure according to claim 7, wherein the lower door panel and the upper door panel are mutually spot welded at the center and both ends, in the vehicle width direction, of the beam forming region forming the lateral beam.

9. The rear door structure according to claim 6, wherein the door panel is joined to the door frame via the reinforcing member.

10. The rear door structure according to claim 9, wherein in a beam forming region forming the lateral beam, one of the lower door panel and the upper door panel is provided with a welding work hole which leads to a coupling portion of the reinforcing member and the other of the lower door panel and the upper door panel.

11. The rear door structure according to claim 10, wherein the lower door panel and the upper door panel are mutually spot welded at the center and both ends, in the vehicle width direction, of the beam forming region forming the lateral beam.

12. The rear door structure according to claim 1, wherein:

the rear glass is attached to the frame portion of the upper door panel;

both ends of the upper edge portion of the lower door panel are provided with a extending portion which extends upward; and the extending portions overlap and are joined to both lateral side portions of the frame portion.

13. The rear door structure according to claim 12, wherein the extending portions overlap and are welded to the upper surface at the lower end of both lateral side portions of the frame portion.

14. The rear door structure according to claim 12, further comprising a reinforcing member which extends over the lateral beam and both lateral edges of the upper door panel and the lower door panel.

15. The rear door structure according to claim 14, wherein in a beam forming region forming the lateral beam, one of the lower door panel and the upper door panel is provided with a welding work hole which leads to a coupling portion of the reinforcing member and the other of the lower door panel and the upper door panel.

16. The rear door structure according to claim 15, wherein the lower door panel and the upper door panel are mutually spot welded at the center and both ends, in the vehicle width direction, of the beam forming region forming the lateral beam.

17. The rear door structure according to claim 14, wherein the door panel is joined to the door frame via the reinforcing member.

18. The rear door structure according to claim 17, wherein in a beam forming region forming the lateral beam, one of the lower door panel and the upper door panel is provided with a welding work hole which leads to a coupling portion of the reinforcing member and the other of the lower door panel and the upper door panel.

19. The rear door structure according to claim 18, wherein the lower door panel and the upper door panel are mutually spot welded at the center and both ends, in the vehicle width direction, of the beam forming region forming the lateral beam.

* * * * *